United States Patent
Gupta et al.

(10) Patent No.: US 11,411,616 B2
(45) Date of Patent: *Aug. 9, 2022

(54) TRUSTED WLAN CONNECTIVITY TO 3GPP EVOLVED PACKET CORE

(71) Applicant: Apple Inc., Cupertino, CA (US)

(72) Inventors: Vivek G. Gupta, San Jose, CA (US); Puneet Jain, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/996,661

(22) Filed: Aug. 18, 2020

(65) Prior Publication Data

US 2020/0382175 A1 Dec. 3, 2020

Related U.S. Application Data

(63) Continuation of application No. 15/916,044, filed on Mar. 8, 2018, now Pat. No. 10,785,673, which is a (Continued)

(51) Int. Cl.
*G06F 21/00* (2013.01)
*H04B 7/0417* (2017.01)
(Continued)

(52) U.S. Cl.
CPC ......... *H04B 7/0417* (2013.01); *H04B 7/0413* (2013.01); *H04B 7/0452* (2013.01);
(Continued)

(58) Field of Classification Search
CPC .. H04B 7/0417; H04B 7/0413; H04B 7/0452; H04B 7/0482; H04B 7/0486;
(Continued)

(56) References Cited

U.S. PATENT DOCUMENTS 8,477,724 B2 7/2013 Bakker et al.
9,526,027 B2 12/2016 Gupta et al.
(Continued)

FOREIGN PATENT DOCUMENTS

CN 101867987 10/2010
CN 101990274 3/2011
(Continued)

OTHER PUBLICATIONS

US 9,497,657 B2, 11/2016, Gupta et al. (withdrawn)
(Continued)

*Primary Examiner* — Ghazal B Shehni
(74) *Attorney, Agent, or Firm* — Kowert, Hood, Munyon, Rankin & Goetzel, P.C.

(57) ABSTRACT

Systems, devices, and configurations to implement trusted connections within wireless networks and associated devices and systems are generally disclosed herein. In some examples, a wireless local area network (WLAN) may be attached to a 3GPP evolved packet core (EPC) as a trusted access network, without use of an evolved packet data gateway (ePDG) and overhead from related tunneling and encryption. Information to create the trusted attachment between a mobile device and a WLAN may be exchanged using Access Network Query Protocol (ANQP) extensions defined by IEEE standard 802.11u-2011, or using other protocols or standards such as DHCP or EAP. A trusted WLAN container with defined data structure fields may be transferred in the ANQP elements to exchange information used in the establishment and operation of the trusted attachment.

20 Claims, 8 Drawing Sheets

Related U.S. Application Data continuation of application No. 15/350,388, filed on Nov. 14, 2016, now Pat. No. 9,949,165, which is a continuation of application No. 13/992,029, filed as application No. PCT/US2012/035568 on Apr. 27, 2012, now Pat. No. 9,526,027.

(60) Provisional application No. 61/481,024, filed on Apr. 29, 2011.

(51) Int. Cl.

| | |
|---|---|
| *H04N 21/2365* | (2011.01) |
| *H04N 21/643* | (2011.01) |
| *H04J 11/00* | (2006.01) |
| *H04L 5/00* | (2006.01) |
| *H04L 27/26* | (2006.01) |
| *H04L 65/611* | (2022.01) |
| *H04W 52/02* | (2009.01) |
| *H04W 88/02* | (2009.01) |
| *H04W 4/70* | (2018.01) |
| *H04W 12/06* | (2021.01) |
| *H04W 12/08* | (2021.01) |
| *H04B 7/0456* | (2017.01) |
| *H04W 72/04* | (2009.01) |
| *H04W 48/06* | (2009.01) |
| *H04W 28/02* | (2009.01) |
| *H04L 47/125* | (2022.01) |
| *H04L 9/40* | (2022.01) |
| *H04L 1/18* | (2006.01) |
| *H04L 1/00* | (2006.01) |
| *H04B 7/0413* | (2017.01) |
| *H04W 68/00* | (2009.01) |
| *H04B 7/0452* | (2017.01) |
| *H04W 72/12* | (2009.01) |
| *H04W 36/14* | (2009.01) |
| *H04B 7/06* | (2006.01) |
| *H04W 88/06* | (2009.01) |
| *H04W 84/12* | (2009.01) |
| *H04W 88/10* | (2009.01) |

(52) U.S. Cl.
CPC ......... *H04B 7/0482* (2013.01); *H04B 7/0486* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0026* (2013.01); *H04L 5/0035* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 5/0092* (2013.01); *H04L 5/0094* (2013.01); *H04L 27/2602* (2013.01); *H04L 27/2613* (2013.01); *H04L 47/125* (2013.01); *H04L 47/14* (2013.01); *H04L 63/10* (2013.01); *H04L 65/4076* (2013.01); *H04N 21/2365* (2013.01); *H04N 21/64322* (2013.01); *H04W 4/70* (2018.02); *H04W 12/06* (2013.01); *H04W 12/08* (2013.01); *H04W 28/0231* (2013.01); *H04W 28/0268* (2013.01); *H04W 48/06* (2013.01); *H04W 52/0203* (2013.01); *H04W 52/0219* (2013.01); *H04W 68/005* (2013.01); *H04W 72/042* (2013.01); *H04W 72/0406* (2013.01); *H04W 72/0413* (2013.01); *H04W 72/1247* (2013.01); *H04W 88/02* (2013.01); *H04B 7/0465* (2013.01); *H04B 7/0478* (2013.01); *H04B 7/0632* (2013.01); *H04B 7/0639* (2013.01); *H04W 36/14* (2013.01); *H04W 84/12* (2013.01); *H04W 88/06* (2013.01); *H04W 88/10* (2013.01); *Y02D 30/70* (2020.08)

(58) Field of Classification Search
CPC .. H04B 7/0465; H04B 7/0478; H04B 7/0632; H04B 7/0639; H04W 4/70; H04W 12/06; H04W 12/08; H04W 28/0231; H04W 28/0268; H04W 48/06; H04W 52/0203; H04W 52/0219; H04W 68/005; H04W 72/0406; H04W 72/0413; H04W 72/042; H04W 72/1247; H04W 88/02; H04W 36/14; H04W 84/12; H04W 88/06; H04W 88/10; H04J 11/0046; H04L 1/0032; H04L 1/1812; H04L 1/1861; H04L 5/0025; H04L 5/0026; H04L 5/0035; H04L 5/0048; H04L 5/0051; H04L 5/0053; H04L 5/0055; H04L 5/0057; H04L 5/0092; H04L 5/0094; H04L 27/2602; H04L 27/2613; H04L 47/125; H04L 47/14; H04L 63/10; H04L 65/4076; H04N 21/2365; H04N 21/64322; Y02D 30/70

See application file for complete search history.

(56) References Cited

U.S. PATENT DOCUMENTS

| | | |
|---|---|---|
| 9,949,165 B2 | 4/2018 | Gupta et al. |
| 2006/0294363 A1 | 12/2006 | Bae et al. |
| 2008/0261655 A1 | 10/2008 | Carpenter et al. |
| 2009/0005033 A1 | 1/2009 | Wijayanathan et al. |
| 2011/0098075 A1 | 4/2011 | Bienas et al. |
| 2011/0128913 A1* | 6/2011 | Chowdhury .......... H04W 92/02 370/328 |
| 2012/0134286 A1 | 5/2012 | Bhalla |
| 2012/0324100 A1 | 12/2012 | Tomici et al. |
| 2013/0121322 A1 | 5/2013 | Salkintzis |
| 2014/0101726 A1 | 4/2014 | Gupta et al. |
| 2017/0289587 A1 | 10/2017 | Gupta et al. |
| 2019/0174011 A1* | 6/2019 | Jabara ................... H04W 12/06 |

FOREIGN PATENT DOCUMENTS

| | | |
|---|---|---|
| CN | 103797888 | 5/2014 |
| WO | 2012149400 A2 | 11/2012 |
| WO | 2012149400 A3 | 11/2012 |

OTHER PUBLICATIONS

"Chinese Application Serial No. 201280032275.2, Office Action dated Oct. 31, 2016", w/English Translation, 25 pgs.
"Chinese Application Serial No. 201280032275.2, Response filed Mar. 2, 2017 to Office Action dated Oct. 31, 2016", w/Claims in English, 11 pgs.
"Chinese Application Serial No. 201280032275.2, Office Action dated Jun. 5, 2017",w/English Translation, 9 pgs.
"Chinese Application Serial No. 201280032275.2, Response filed Aug. 21, 2017 to Office Action dated Jun. 5, 2017", w/claims in English, 19 pgs.
"European Application Serial No. 12777058.4, Extended European Search Report dated Jul. 23, 2015", 10 pgs.
"European Application Serial No. 12777058.4, Response filed Feb. 22, 2016 to Extended European Search Report dated Jul. 23, 2015", 32 pgs.
"European Application Serial No. 17198668.0, Extended European Search Report dated Feb. 7, 2018", 11 pgs.
"IEEE 802.11 u-2011 Part 11: Wireless LAN Medium Access Control (MAC) and Physical Layer (PHY) Specifications: Amendment 9: Interworking with External Networks", Std 802.11 u-2011. Local and Metropolitan Area Networks. IEEE Standards Associa-

(56) References Cited

OTHER PUBLICATIONS tion. IEEE Computer Society., Retrieved from the Internet: <URL:http://standards.ieee.orgjgetieee802/download/802.11u-2011.pdf> [retrieved on Jul. 6, 2012, (Feb. 25, 2011), 1-208.

"International Application Serial No. PCT/US2012/035568, International Preliminary Report on Patentability dated Nov. 7, 2013", 5 pgs.

"International Application Serial No. PCT/US2012/035568, Search Report dated Oct. 31, 2012", 3 pgs.

"International Application Serial No. PCT/US2012/035568, Written Opinion dated Oct. 31, 2012", 3 pgs.

"Solution for Trusted WLAN access to EPC", 3GPP TSG SA WG2 Meeting #86, (Jul. 5, 2011), 7 pgs.

"Study on S2a Mobility based On GTP & WLAN access to EPC (SaMOG); Stage 2", 3GPP TR 23.8ab, V0.1.0 (Release 11), (Apr. 2011), 8 pages.

"Technical Specification group core network and terminals", 3GPP system to wireless local area network interworking; WLAN UE to network protocols; stage3; 3GPP TS 24.234 V10.1.0, (Mar. 31, 2011), 7 pgs.

"The Future of Hotspots: Making Wi-Fi as Secure and Easy to Use as Cellular", Cisco, White Paper, (2012), 9 pgs.

"Universal Mobile Telecommunications System (UMTS); LTE; 3GPP system to Wireless Local Area Network (WLAN) interworking; WLAN User Equipment (WLAN UE) to network protocols; Stage 3 (3GPP TS 24.234 version 10.1.0 Release 10)", Technical Specification, European Telecommunications Standards Institute (ETSI), 650, Route Des Lucioles ; F-06921 Sophia-Antipolis; France, vol. 3qoo Ct 1, No. V10.1.0, (Apr. 1, 2011).

Alcatel-Lucent, "Solution for Trusted WLAN w/o UE impact", 3gpp Draft; S2-111627_Solution For Trusted Wlan No Ue Impact_V7, 3rd Generation Partnership Project (3GPP), Mobile Competence Centre ; 650, Route Des Lucioles ; F-06921 Sophia-Antipolis Cedex; France, vol. Sa Wq2, No. Bratislava, (Apr. 6, 2011).

Huawei, "Discussion on 1-WLAN and WLAN relationship", 3GPP Draft; C1-093348. 3rd Generation Partnership Project (3GPP). Mobile Competence Centre; 650. Route Des Lucioles ; F-06921 Sophia-Antipolis Cedex; France, No. Sevilla, [retrieved on Aug. 31, 2009], (Aug. 24, 2009), 7 pgs.

Intel, et al., "Solution for Trusted WLAN access to EPC", 3GPP Draft; S2-113148V2. 3rd Generation Partnership Project (3GPP). Mobile Competence Centre ; 650. Route Des Lucioles ; F-06921 Sophia-Antipolis Cedex; France, vol. SA WG2. No. Naantali, (Jul. 5, 2011), 7 pgs.

\* cited by examiner

TRUSTED WLAN CONNECTIVITY TO 3GPP EVOLVED PACKET CORE

PRIORITY CLAIM

This application is a continuation of U.S. patent application Ser. No. 15/916,044, filed Mar. 8, 2018, which is a continuation of U.S. patent application Ser. No. 15/350,388, filed Nov. 14, 2016, now issued as U.S. Pat. No. 9,949,165, which is a continuation of U.S. patent application Ser. No. 13/992,029, filed Aug. 19, 2013, now issued as U.S. Pat. No. 9,526,027, which is a U.S. National Stage Filing under 35 U.S.C. 371 from International Patent Application Serial No. PCT/US2012/035568, filed Apr. 27, 2012, published on Nov. 1, 2012 as WO 2012/149400A2, which, claims priority to U.S. Provisional Patent Application Ser. No. 61/481,024, filed Apr. 29, 2011, each of which are incorporated herein by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless networks and wireless network communications facilitated by various devices and systems. Some embodiments relate to trusted connections established within wireless networks by associated devices and systems.

BACKGROUND

As the use of mobile wireless devices, such as smart phones and tablet devices, becomes more ubiquitous, the demands on the limited amount of radio frequency spectrum used by those devices has increased, resulting in wireless network congestion and reduced bandwidth for devices operating in the licensed spectrum. A variety of techniques have been introduced to provide additional bandwidth, including data offloading from a Wireless Wide Area Network (WWAN) to other networks such as another WWAN or a Wireless Local Area Network (WLAN). For example, data may be offloaded from a 3G or 4G WWAN operating in accordance with a standard from the 3GPP standards family, to a Wi-Fi WLAN operating in accordance with a standard from the 802.11 standards family.

With existing data offloading techniques provided with use of some 3GPP wireless network standards, and in other settings, a WLAN access network is treated as an untrusted access network. This causes WLAN access to attach to a 3GPP Evolved Packet Core (EPC) using an Evolved Packet Data Gateway (ePDG). An additional Internet Protocol Security (IPSec) tunnel also may need to be established between the mobile device and the ePDG. This causes extra tunneling and encryption overhead for all communication between the mobile wireless device and the 3GPP EPC.

DESCRIPTION OF THE EMBODIMENTS

Figure 1A:
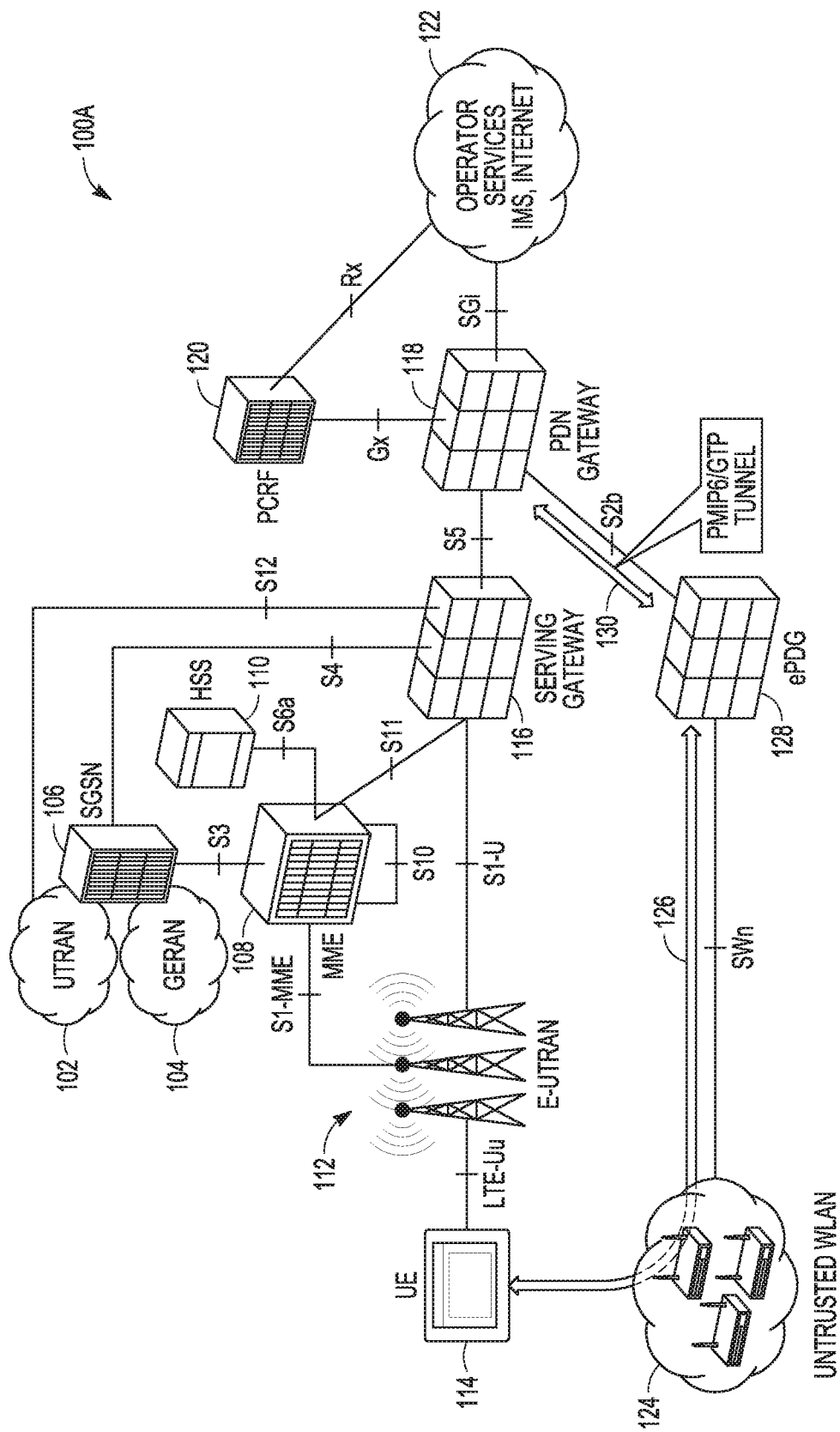
FIG. 1A illustrates an example configuration of an untrusted WLAN attached to a 3GPP EPC using an S2b interface operable in connection with some examples.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations provided herein describe a mechanism by which a mobile device can attach to a 3GPP EPC using a WLAN as a trusted access network. In some examples, this removes the use of an intermediate ePDG entity and also removes the extra tunneling and encryption overhead from WLAN communications. This enables a WLAN access network to be treated similar to other non-3GPP trusted access networks such as a CDMA High Rate Packet Data (HRPD) network, a WiMAX (e.g., IEEE standard 802.16) network, and the like.

Additionally, techniques provided herein describe a mechanism to communicate an Access Point Name (APN) and other NAS (Non-Access Stratum) parameters and configuration options when the mobile device is connecting/attaching to 3GPP core, with the use of signaling messages. These signaling messages may be communicated between user equipment (UE) such as a mobile wireless device and components of a WLAN Access Network such as a Wi-Fi access point or access controller (AP/AC). In one example embodiment, the signaling messages are provided according to communications using IEEE standard 802.11u-2011. Such a signaling message mechanism is extensible and can be used to carry additional information elements and fields.

Further, the parameters for the information elements and fields may be defined for both trusted and untrusted attachment.

With existing techniques, a WLAN is unable to be established as a trusted access network to a 3GPP EPC. In some example embodiments described herein, IEEE 802.11u ANQP (Access Network Query Protocol) extensions are used to provide various data structures and to exchange information. The ANQP extensions accordingly may be used for establishing a trusted attachment between the UE and WLAN access network, and authenticate with elements of the 3GPP EPC such as a packet data network gateway (PDN-GW) and an authentication and authorization system (AAA) server. This information can be exchanged either prior to association with the WLAN access network or after association/connection establishment. A container that may be used for such an information exchange may be provided by definitions of the IEEE standard 802.11u-2011 or another standard from the IEEE 802.11 standards family. The contents of this container are extensible and may be further defined by a wireless network specification, for example, a 3GPP WWAN specification (such as 3GPP Release 11 and beyond).

WLAN access networks have evolved with development of IEEE standard amendments 802.11i, 802.1x, 802.11u, and the Wi-Fi Alliance Hotspot 2.0 standard and certification program. For example, a WLAN access network may implement IEEE 802.11i and IEEE 802.1x (e.g., Wi-Fi Protected Access (WPA2) Enterprise class) based security mechanisms, as use of a IEEE 802.11u standard implementation provides mechanisms that can assist the process of Access Network Discovery and Selection. To proceed with establishment of a trusted access network, the UE may be authenticated with the 3GPP network using Extensible Authentication Protocol Method for UMTS Authentication and Key Agreement (EAP-AKA) over a STa interface with a trusted WLAN access network. The techniques described herein provide additional detail on these and similar mechanisms that may be used in an authentication and connection establishment process with a trusted WLAN access network.

FIG. 1A provides an illustration of an example configuration 100A of an Untrusted WLAN 124 attached to a 3GPP EPC operable in connection with some examples described herein. FIG. 1A illustrates a number of components used to provide network connectivity with UE 114, including a LTE-Uu interface to an E-UTRAN network 112, and a connection with the 3GPP EPC through Untrusted WLAN 124, as described in the following paragraphs.

The back-end system architecture of the 3GPP EPC includes components such as one or more mobile management entity (MME) 108 connected to the E-UTRAN using an S1-MME interface (with multiple MMEs that may be connected using a S10 interface); a Serving Gateway 116 connected to the E-UTRAN using an S1-U interface; a S11 interface between the MME 108 and the Serving Gateway 116; a Home Subscriber Server (HSS) 110 connected to the MME 108 with a S6a interface; and an 2G/3G Serving GPRS Support Node (SGSN) 106 used to facilitate UTRAN 102 (e.g., UTMS) and GERAN 104 (e.g., GSM) networks, connected to the MME 108 with a S3 interface and connected to the Serving Gateway 116 using S4 and S12 interfaces. The Serving Gateway 116 is further connected to a Packet Data Network Gateway (PDN-GW) 118 using an S5 interface, while the PDN gateway 118 is connected using a Gx interface to a Policy and Charging Rules Function (PCRF) node 120. Various Operator Services 122 (such as an IP Multimedia Subsystem (IMS) and the Internet) are connected to the PCRF 120 and the PDN Gateway 118 using Rx and SGi interfaces respectively.

The 3GPP EPC performs various operations or verifications to determine whether an access network may be attached as a trusted network. For example, in 3GPP Version 11 (LTE-A) technical specification (TS) 24.302, the Home Public Land Mobile Network (HPLMN) operator of the 3GPP EPC determines whether a connected non-3GPP IP access network is a trusted or untrusted IP access network.

For attachment of an untrusted non-3GPP IP access network, the communication between the UE 114 and the non-3GPP IP access network is not considered to be secure. To provide communications over an untrusted non-3GPP IP access network to a 3GPP EPC using existing techniques, an IPSec tunnel would be established with the 3GPP on a per access basis, as needed, to secure communications. As shown in FIG. 1A, this may result in increased tunneling and encryption overhead for all communications between the UE 114 and the 3GPP EPC occurring through the Untrusted WLAN 124.

FIG. 1A illustrates an IPSec connection 126 with the 3GPP EPC established among the UE 114, an Untrusted WLAN 124, and an ePDG 128. To establish a connection between a UE 114 and the 3GPP EPC using the Untrusted WLAN 124, the Untrusted WLAN 124 is connected to the ePDG 128 using an SWn interface, which facilitates the IPSec connection 126 between the UE 114 and the ePDG 128. The ePDG 128, which is connected to the PDN Gateway 118, further requires use of a PMIP6/GTP tunnel 130 over an S2b interface. Thus, the Untrusted WLAN 124 connects to the PDN-GW 118 using the ePDG 128 as an intermediary, because the Untrusted WLAN 124 is considered as an untrusted or insecure attachment.

Using the techniques and configurations provided by some example embodiments, a WLAN access network may be considered as trusted by the 3GPP EPC. Various mechanisms may be used to configure security among the communications of the UE, WLAN, and 3GPP EPC. For example, the UE may use IEEE 802.11i and IEEE 802.1x (aka WPA2 Enterprise class in WFA) based security mechanisms to secure the connection between the UE and the WLAN. IEEE standard 802.11u defines mechanisms for Access Network Discovery and Selection, including ANQP extensions for exchanging information. Further, the UE may be authenticated with the WLAN and the 3GPP EPC using EAP-AKA methods. With these authentication methods, use of an ePDG is not required, and WLAN access by a UE can be considered as a trusted access by the 3GPP EPC.

Figure 1B:
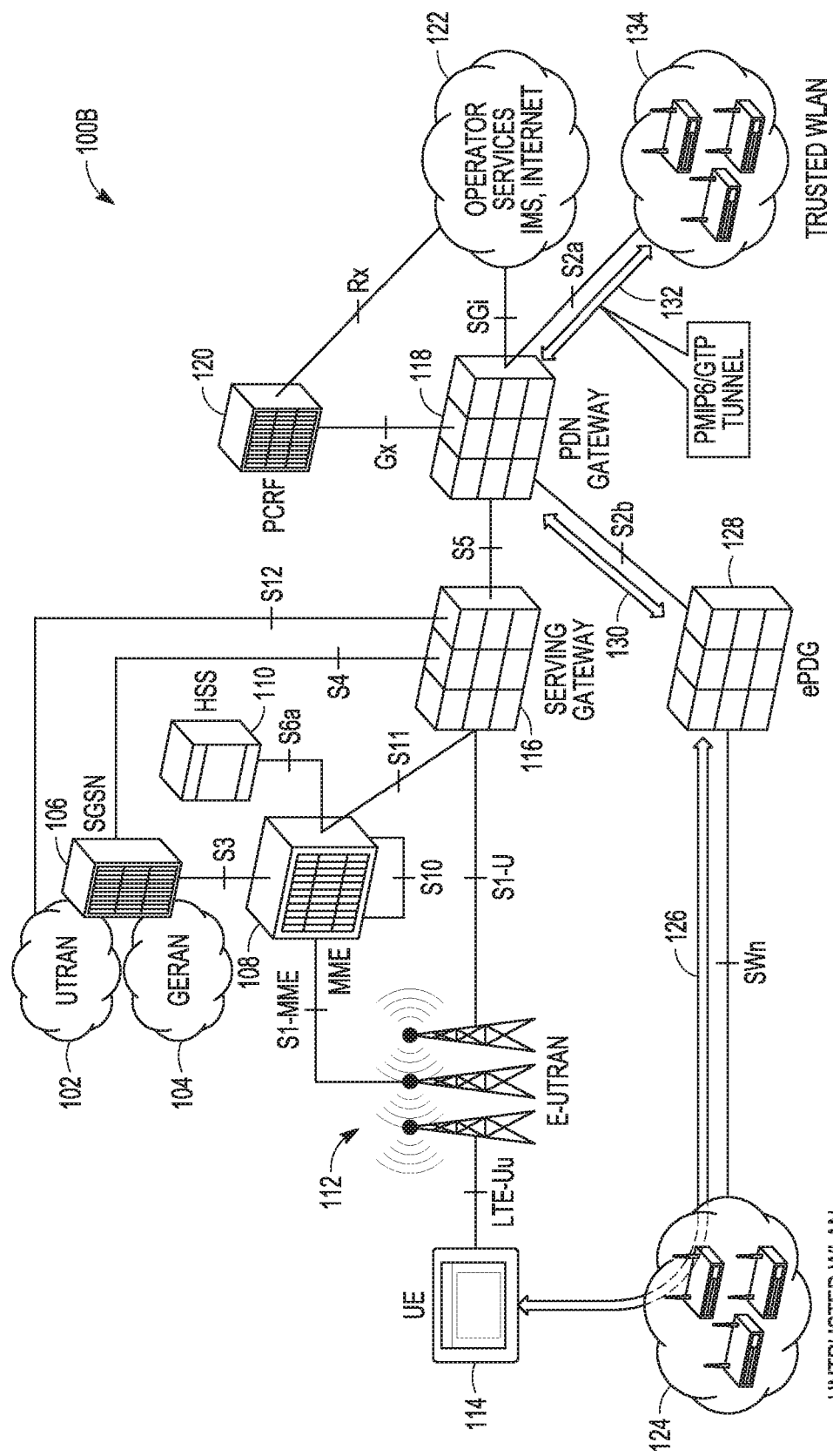
FIG. 1B illustrates an example configuration of a trusted WLAN attached to a 3GPP EPC using an S2a interface operable in connection with some examples.

FIG. 1B illustrates an example configuration 100B of a Trusted WLAN 134 attached components of to a 3GPP EPC using an S2a interface, with similar numbered elements as FIG. 1A. In this scenario, the Trusted WLAN 134 connects to the PDN-GW 118 directly, using a PMIP6/GTP Tunnel 132, as the Trusted WLAN 134 is established as a trusted access network by the 3GPP EPC. The UE 114 or any other UE may connect to the 3GPP EPC using the Trusted WLAN 134 (the connection with UE 114 not shown).

Upon attachment of a trusted non-3GPP IP access network, the communication between any UE and the non-3GPP access network is considered to be secure. Thus there is no use for operations at the ePDG 128 (or another security gateway), avoiding increased tunneling or encryption overhead to facilitate communication between UEs and the 3GPP EPC. The S2a interface can support either PMIP6 or GTP options for mobility management.

As further described herein, the Trusted WLAN 134 may employ various authentication techniques and communications with the 3GPP EPC and connected UEs to establish trusted communications (which may be required for recognition as a trusted access network). The Trusted WLAN 134 may employ IEEE 802.11i and IEEE 802.1x based security mechanisms, and the UE may employ WPA2 Enterprise class security mechanisms. IEEE 802.11u mechanisms may be used for Network Discovery and Selection. For example, IEEE 802.11u based ANQP and HotSpot 2.0 based extensions may allow the UE to exchange information with the 3GPP EPC to establish the trusted communication. The UE may be authenticated with the 3GPP EPC using EAP-AKA, EAP-AKA Prime (EAP-AKA') or EAP for GSM Subscriber Identity (EAP-SIM) methods.

Figure 2:
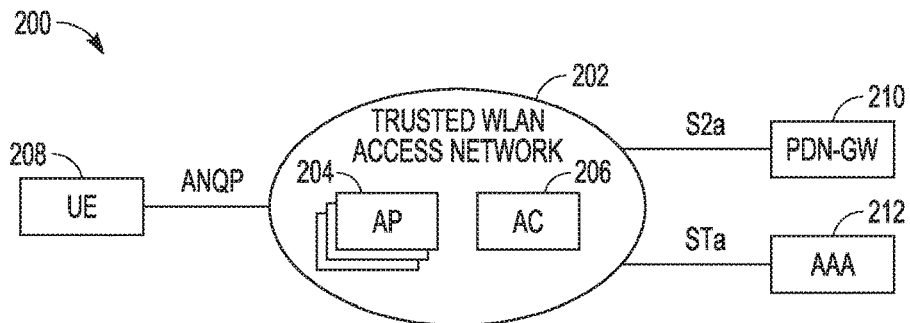
FIG. 2 illustrates an example functional model for a trusted WLAN access network used in connection with some examples.

FIG. 2 illustrates a functional model 200 for establishing access via a Trusted WLAN Access Network 202 according to one example embodiment. As illustrated, the UE 208 is configured to establish a connection to the Trusted WLAN Access Network 202, and exchange information with the Trusted WLAN Access Network 202 via ANQP extensions. The Trusted WLAN Access Network 202 may include one or more Access Points (APs) 204, and an Access Controller (AC) 206. For example, the Trusted WLAN Access Network 202 may be provided as a Wi-Fi network operating according to a standard from the IEEE 802.11 standards family.

The Trusted WLAN Access Network 202 may establish authentication and communication links with one or more components of a 3GPP EPC. For example, the Trusted WLAN Access Network 202 may use an S2a interface with the Packet Data Network Gateway (PDN-GW) 210, to exchange data communications with either the APs 204 or the AC 206. The Trusted WLAN Access Network 202 may use a STa interface for authentication and authorization communications, for example, to communicate with an AAA 212 of the 3GPP EPC.

The UE 208 and Trusted WLAN Access Network 202 may specify additional parameters when attaching to the 3GPP EPC using the S2a interface and the STa interface. These parameters may be provided using a Trusted WLAN container as explained in the following paragraphs and illustrated in FIG. 3B, or provided by other data containers or formats. The parameters also may be used to indicate additional signaling capabilities over the WLAN air-interface. For example, the parameters may include the following:

- An indication of the Access Point Name (APN) network identifier of the Packet Data Network (PDN) that the UE intends to connect to.
- An indication of the type of addressing the UE supports (e.g., IPv4, IPv6, or IPv4v6). A PDN-GW (not shown) in the EPC can use this indication to allocate bearers accordingly.
- An indication of whether the connection between the UE and the 3GPP EPC is being established over initial attach or upon handover of a PDN connection from a 3GPP access network to a trusted WLAN access network through an S2a interface. If the connection is occurring upon handover, the UE may provide the IPv4 address or IPv6 prefix that the UE was using prior to handover. If the connection is occurring as an initial attach, then an IP address may be allocated.

IP Address allocation to UEs connecting through a trusted WLAN may be configured to follow standard procedures for establishing trusted non-3GPP access. For example, in 3GPP LTE networks, this may implement enhancement standards for non-3GPP access such as defined in TS 23.402. Further, certain Protocol Configuration Options such as deferred IP Allocation may be enabled.

Extensions to Access Network Query Protocol (ANQP)

IEEE standard 802.11u-2011 defines ANQP and the use of this protocol for discovery of external networks and their properties. ANQP can be used to exchange information over an IEEE 802.11-standard link layer in a secure manner. This information may be exchanged to establish a WLAN access networks as a trusted network with a 3GPP EPC, and to authenticate devices connected to such a trusted network. As one example of ANQP usage, IEEE standard 802.11u defines an ANQP-based Information Element 3GPP Cellular Network Information which may serve as a generic container and provide cellular information such as list of PLMNs, to assist WLAN-enabled UEs in a selection of 3GPP networks.

While the Access Network Discovery and Selection Function (ANDSF) may be used to provide operator policies related to non-3GPP accesses of the WLAN to the UE, ANQP can provide parameter values that can be used by the UE while taking action based on policies provided by ANDSF. Therefore, the contents of the 3GPP Cellular Network Information container may be extended by 3GPP standards to include parameters to enable a trusted WLAN to attach to a 3GPP EPC. Additionally, a new container may also be defined for trusted WLAN attachment to a 3GPP EPC and to extend the list of information elements supported by ANQP.

In connection with some embodiments, ANQP is used to provide extensions including new elements that support Wi-Fi Alliance Hotspot 2.0 features. These elements are defined for use in infrastructure base station subsystems (BSSs) only. Therefore, for the elements defined as part of ANQP extensions, the requesting UE (e.g., the STA Wi-Fi network client) is always a non-AP UE and the responding UE is always an AP.

Figure 3A:
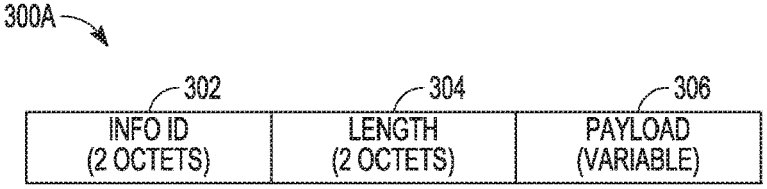
FIG. 3A illustrates an example format of an Access Network Query Protocol (ANQP) element used in connection with some examples.

ANQP elements, as illustrated in FIG. 3A, may be defined to have a common format providing an Info ID field, a length field, and a variable length element-specific information field. Further, each ANQP element is assigned a unique Info ID. The IEEE 802.11 ANA (Assigned Numbers Authority) has allocated a block of 32 ANQP Info IDs that are assigned to new ANQP elements. Table 1, illustrated below, illustrates these elements and ID values.

TABLE 1

| ANQP Element Name | Info ID Value |
| --- | --- |
| Operator Friendly Name | <IEEE 802.11 ANA> |
| Hotspot WAN Metrics | <IEEE 802.11 ANA + 1> |
| Hotspot Firewall Port Configuration Query | <IEEE 802.11 ANA + 2> |
| Trusted WLAN Container | <IEEE 802.11 ANA + 3> |
| Reserved | <IEEE 802.11 ANA + 4 to ANA + 31> |

ANQP Element Format

FIG. 3A illustrates an example format of an ANQP element used in connection with some example embodiments. ANQP element 300A may be defined to have a common format providing a 2-octet Info ID field 302, a 2-octet Length field 304, and a variable-length element-specific payload information field 306. The Info ID field 302 is equal to the value in Table 1 above corresponding to the ANQP element identifier. The Length field 304 is a 2-octet field and has a value representing the length of the Payload Information field 306.

The Payload Information field 306 provides a generic container whose content may be defined by a protocol specification, such as a 3GPP specification. The following section provides one such example container for inclusion in an ANQP Payload Information field, referred to as a "Trusted WLAN Container."

Definition of Trusted WLAN Container ANQP Element

Figure 3B:
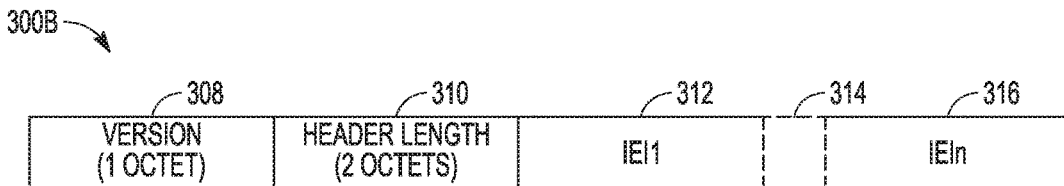
FIG. 3B illustrates an example data structure of a trusted WLAN container provided in an ANQP element used in connection with some examples.

FIG. 3B illustrates the general structure of an example Trusted WLAN Container. The Trusted WLAN Container 300B is an ANQP element containing information that allows a trusted WLAN access network to connect to the 3GPP Enhanced Packet Core (EPC). This includes information such as the APN the UE wants to connect to, whether access is to be obtained to the Internet directly or to the EPC, the PDN-GW Type, the User Identifier (IMSI (International Mobile Subscriber Identity)/TMSI (Temporary Mobile Subscriber Identity)), and the like.

A Version field 308 defines the version of the Trusted WLAN Container. For example, a value of "00000000" may designate Version 1, while values 00000001 through 11111111 may be reserved or assigned for other purposes.

A Header Length field 310 may define the number of octets after the Header Length in the Trusted WLAN Container.

An Information Element Identifier (JET) field (provided in IEI1 field 312, IEIn−1 field 314, and IEIn field 316) may define the information element contents. For example:
00000000 APN
00000001 PDN Type
00000010 Access Type
00000011 NAI
00000100 SIPTO/LIPA Permissions
00000101 Support for online charging
00000110 FQDN of OCS entity
00000111 Protocol Configuration Options
00001000 Attach Type
00001001 through 11111111 Reserved For each of the IEIs, the first octet is the IE identifier, this is followed by the length of the JET and then any other JET specific fields. The JET specific fields may include:

APN. This specifies the Access Point Name the user wants to connect to.

PDN Type. This specifies the type of addressing supported by the UE, e.g., IPv4/IPv6/IPv4v6. The PDN-GW allocates bearers accordingly.

Access Type. This specifies the access type. The user may obtain Direct Internet access, or the user could get access to the 3GPP EPC and other services in the operator domain.

NAI. This specifies the Network Access Identifier used for authorizing the user.

SIPTO (Selected IP Traffic Offloading)/LIPA (Local IP Access) Permissions. This specifies if the UE has permissions for local IP access or for selected IP traffic offloading.

Support for Online Charging. This provides an indication if the trusted WLAN needs to support online charging interactions for the UE.

Fully Qualified Domain Name (FQDN) of Online Charging Server (OCS) entity. This is the address of the OCS entity in case the trusted WLAN access needs to support online charging interactions.

Protocol Configuration Options. This may provide a container that could include options such as deferred IP Allocation. Other options defined by a 3GPP specification may also be used.

Attach Type. This may indicate if the connection is an initial attach or a handover attach.

Reserved: For Future use. Other parameters may be added.

PLMN List Information Element

Figure 3C:
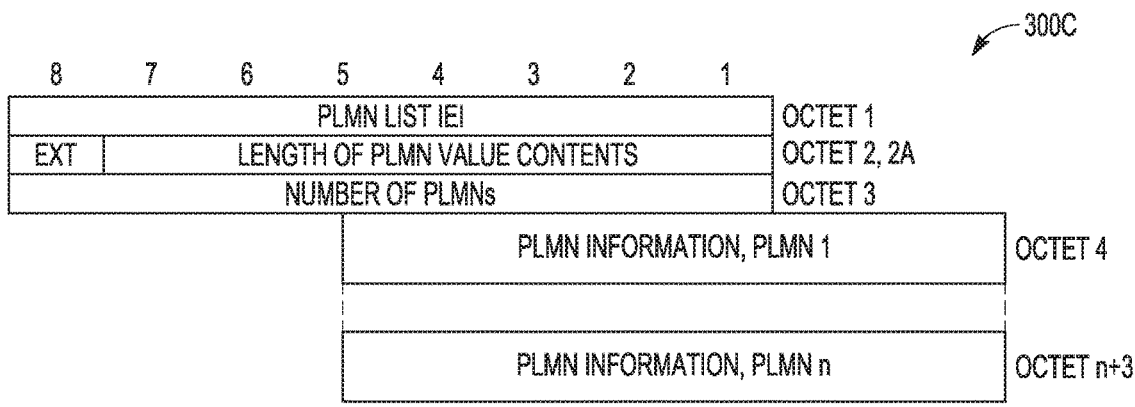
FIG. 3C illustrates an example data structure of a Public Land Mobile Network (PLMN) List information element used in connection with some examples.

FIG. 3C illustrates an example data structure 300C of a Public Land Mobile Network (PLMN) List information element used in connection with some examples. The PLMN List information element may be communicated among the network to indicate PLMNs that can be selected from the WLAN. The PLMN List information elements are used to provide PLMN identifiers. The data structure 300C may be communicated using ANQP between a UE and Trusted WLAN Access Network during establishment of the trusted connection with the UE, for example to identify which 3GPP networks are available for connection through the WLAN Access Network.

Figure 3D:
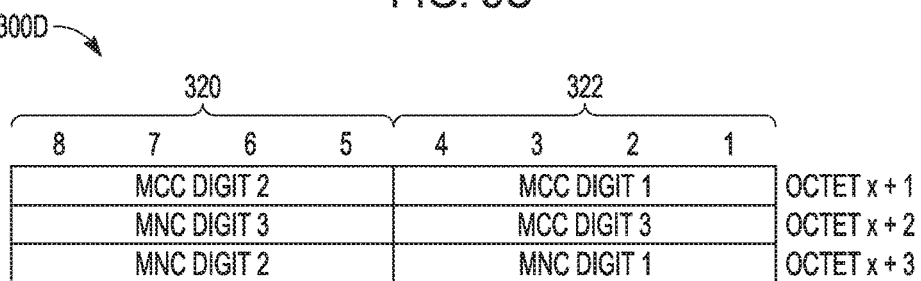
FIG. 3D illustrates an example structure of a PLMN information portion of a PLMN List information element used in connection with some examples.

FIG. 3D illustrates an example data structure 300D of a PLMN information portion of a PLMN List information element used in connection with some examples. As shown in FIG. 3C, the "Number of PLMNs" (octet 3) contains the number of PLMN information items in the list. Bit 8 of octet 3 is the most significant bit and bit 1 of octet 3 the least significant bit. Coding of PLMN information for each PLMN List information element may include the following:

MCC, Mobile Country Code (octet x+1 for digits 1 and 2, octet x+2 bits 1 to 4 for digit 3 (e.g., extending to the 4 least significant bit portion 322 in FIG. 3D)) The MCC field may be coded in accordance with standards provided by ITU-T Rec. E212, Annex A.

MNC, Mobile Network Code (octet x+3 for digits 1 and 2, octet x+2 bits 5 to 8 for digit 3 (e.g., extending to the 4 most significant bit portion 320 in FIG. 3D)). The coding of this field is the responsibility of each administration but Binary-coded decimal (BCD) coding is used. The MNC may include 2 or 3 digits. For PCS 1900 for North America, certain Federal regulations mandate that a 3-digit MNC be used. However a network operator may decide to use only two digits in the MNC over the radio interface. In this case, bits 5 to 8 of octet x+2 shall be coded as "1111". Mobile equipment may be configured to accept MNC coded in such a way.

Example Connection Establishment Operations

Figure 4:
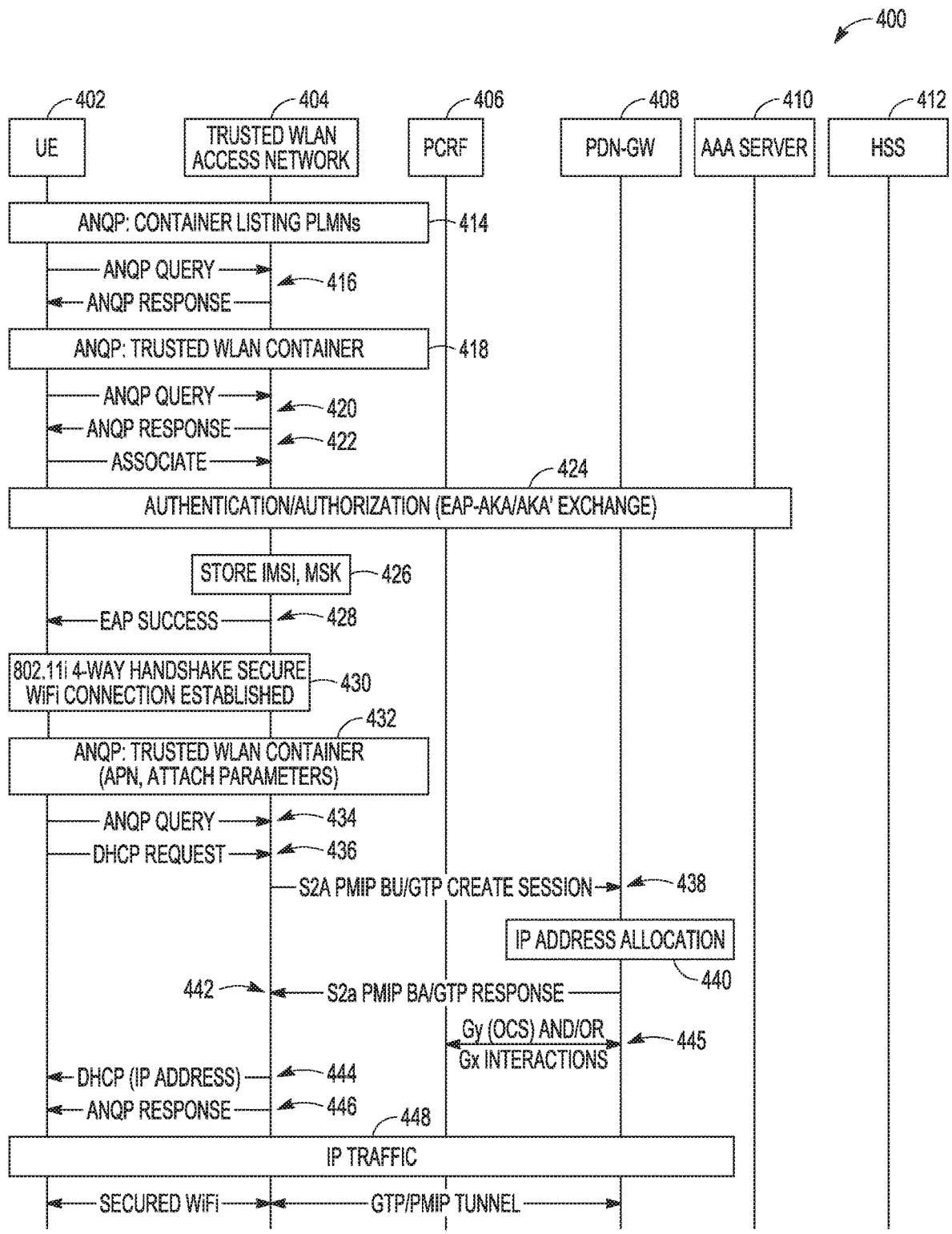
FIG. 4 illustrates example operations performed for establishing a trusted attachment among a UE, WLAN, and a 3GPP EPC in connection with some examples.

FIG. 4 illustrates example operations 400 performed for establishing a trusted network attachment among a UE 402, a WLAN Access Network 404, and components of a 3GPP EPC in connection with some example embodiments. As illustrated, the components of the 3GPP EPC involved in the trusted attachment operations may include a PCRF node 406, a PDN-GW 408, an AAA Server 410, and an HSS 412, although additional, fewer, or substitute components may also be involved a trusted network attachment.

As illustrated, an ANQP element 414 providing a container including a listing of PLMNs may be communicated and exchanged between the UE 402 and the WLAN Access Network 404. Alternatively, the information communicated via ANQP may be provided using other techniques and communication (for example, using DHCP or EAP, as later discussed). As shown in operation 416, the UE uses the container within an ANQP Query to request a list of PLMNs supported by the WLAN Access Network, and the WLAN Access Network returns in the container a list of PLMNs supported in the ANQP Response based on static configuration. The format of this container may be specified by a network communication specification (for example, a 3GPP Cellular Network Information container defined by an IEEE 802.11u standard).

As illustrated, an ANQP element 418 providing a container including connection parameters for UE connection with a 3GPP EPC may be communicated and exchanged between the UE 402 and the WLAN Access Network 404. As shown in operation 420, the UE uses the container within an ANQP Query to communicate connectivity information to the WLAN Access Network 404. The format of this container may be specified by a network communication specification (for example, a trusted WLAN container defined by an IEEE 802.11u standard).

Based on the information received from the ANQP Query Response, the UE 402 may determine whether to perform an association with the 3GPP EPC through the WLAN Access Network 404. In response to a determination to proceed, an association command in operation 422 is provided from the UE 402 to the WLAN Access Network 404.

Alternatively, other network communication protocols may be used to communicate connection parameters for UE connection with the 3GPP EPC, without use of ANQP messages. In one example, additional or substitute parameters may be sent through one or more EAP messages, such as being included within the authentication and authorization message exchange of operation 424 described below. As another example, further described below, one or more DHCP messages may be used to exchange attachment parameters as described for operations 436 and 444 described below.

Returning to use of ANQP-communicated parameters depicted in FIG. 4, in operation 424, the WLAN Access Network 404 proceeds with authentication and authorization operations among the UE 402, the WLAN Access Network 404, and the 3GPP EPC. For example, the entities may perform various 802.11 and 3GPP standard security exchanges, such as having the UE 402 send EAP Request/Identity and the WLAN Access Network 404 reply with EAP Response/Identity. Further, the WLAN Access Network 404 may send an Authentication Request message to the AAA server 410 with the NAI of the UE, the VPLMN-id, the WLAN Access identity and the MAC address of the UE 402 to the AAA Server 410 as well as an indication whether the WLAN Access Network 404 supports access to the 3GPP EPC or only provides a direct access to Internet. The message may be routed via one or several AAA proxies. The AAA server 410 may obtain security material and authorization data from the HSS 412. Further EAP-AKA exchanges may be executed per 3GPP specifications. For example, the AAA Server 410 may send an EAP Success message to the WLAN Access Network 404 that includes the WLAN keying material ("Pairwise Master Key") and adds Authorization data for the UE 402 in the AAA underlying message.

In operation 426, the WLAN Access Network 404 may store the WLAN keying material to be used in communication with the authenticated UE. In operation 428, the WLAN access network informs the UE 402 about the successful authentication with an EAP Success message.

In operation 430, the WLAN Access Network 404 and the UE 402 perform a 4-Way handshake per an 802.11 security procedure (e.g., an 802.11i procedure) and derive session keys to secure the 802.11 link. Upon establishment of the link, network information may be exchanged with the UE, for example in a Generic Container.

As depicted in operation 432, the UE 402 uses the Generic Container over the now-secured 802.11 link to provide attachment parameters to the WLAN Access Network 404. Attachment parameters may include the preferred APN, PDN Type, Attach Type and other protocol configuration options. This may be provided in an ANQP query in operation 434. Alternatively, network information exchanged between the UE 402 and the WLAN Access Network 404 in operation 432 may be provided from communications using other communication protocols, such as DHCP or EAP. If using DHCP, the additional parameters may be sent in a DHCP Request message as in operation 436, without use of an ANQP query as in operation 434 or an ANQP response in operation 446.

In some embodiments, the WLAN Access Network 404 may send an ANQP response back to the UE 402 (not shown) with a delay indicating that the UE 402 needs to come back and query for the response at a later time. The delay interval may be in seconds. After the delay interval has passed, the UE 402 (e.g., the STA) may send an ANQP Comeback Request to the WLAN Access Network 404 requesting the response to the query.

At least two alternative operations may be used to obtain an IP address for the UE 402. The first set of operations to obtain an IP address, illustrated in FIG. 4, illustrates use of a DHCP request in operation 436, in addition to the ANQP query in operation 434. For example, after the ANQP query of operation 434, the UE 402 sends a DHCP request in operation 436 to the WLAN Access Network 404 over the secured 802.11 link. As explained below, this triggers IP connectivity establishment procedures in the network, which results in the IP address response of operation 444.

A second set of alternative operations to obtain an IP address, not fully illustrated in FIG. 4, relies on use of the ANQP query to obtain an IP address for the UE 402. Thus, the DHCP request of operation 436 is not performed, but instead DHCP or other IP address request parameters are carried inside of the ANQP query as in operation 434. This triggers similar IP connectivity establishment procedures in the networks, to result in an IP address response being returned in the ANQP response as in operation 446.

In operation 438, the IP connectivity establishment operations may result in the WLAN Access Network 404 sending an IP request to the PDN-GW 408. For example, the WLAN Access Network 404 may send a Proxy Binding Update message to the PDN-GW 408 if S2a interface is PMIP-based, or may send a GTP Create Bearer Request message if the S2a interface is GTP-based. In operation 440, the PDN-GW 408 may allocate an IPv4 address or IPv6 prefix based on the PDN type to the UE 402 per 3GPP procedures. In operation 442, the WLAN Access Network 404 may receive an IP response from the PDN-GW 408. For example, the PDN-GW 408 may send a Proxy Binding Ack message to the WLAN Access Network 404 if the S2a interface is PMIP-based or a GTP Create Bearer Response message if the S2a interface is GTP-based.

In operation 444, the WLAN Access Network 404 may send the IP address allocated by the PDN-GW 408 to the UE 402 via DHCP Response message. In some further embodiments, the IP Address allocated may be provided in an ANQP element such as a generic container. This may remove the use of separate DHCP request/response messages to allocate an IP Address.

The WLAN Access Network 404 may use a generic container over the secure 802.11 link to send additional configuration parameters to the UE. This may include the selected APN and any Protocol Configuration Options specified by the PDN-GW 408. Thus, additional ANQP communications may be exchanged between the UE 402 and the WLAN Access Network 404. The ANQP Response in operation 446 may be sent in response to the ANQP query in operation 434.

Upon successful attachment of the WLAN Access Network 404 and connection establishment with the UE 402, the UE 402 may send and receive IP Traffic in operation 448 over the secured WLAN link with the WLAN Access Network 404, and use the established PMIP/GTP tunnel to communicate further with the 3GPP EPC.

Figure 5:
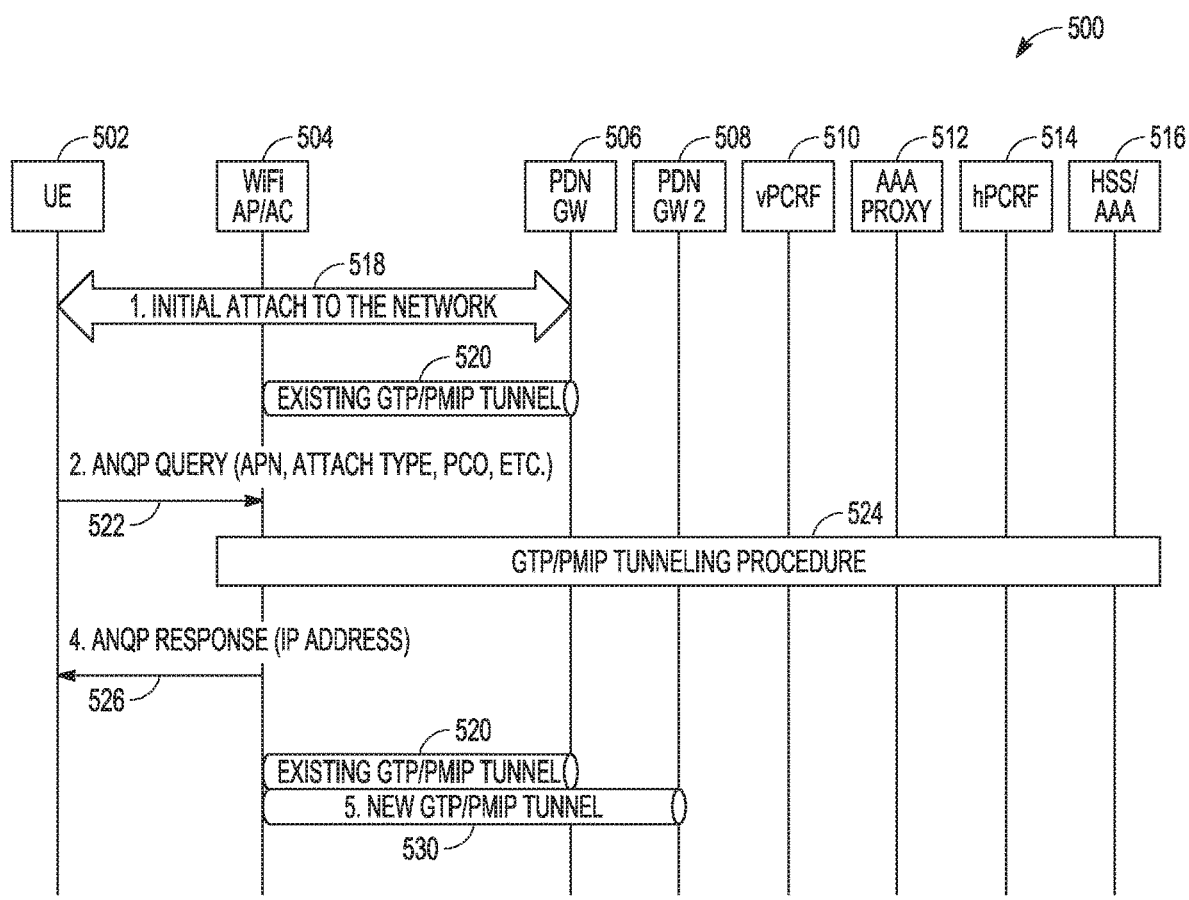
FIG. 5 illustrates example operations performed for an additional Packet Data Network (PDN) connection establishment procedure in connection with some examples.

FIG. 5 illustrates operations performed for an additional PDN connection establishment procedure in connection with some example embodiments. Specifically, the following operations may be used when an existing GTP/PMIP tunnel 520 exists between the trusted WLAN access network (provided by a WiFi AP/AC 504) and the 3GPP EPC (provided by PDN-GW 506). The existing GTP/PMIP tunnel results from an initial attachment 518 from the UE 502 to the PDN-GW 506 of the 3GPP EPC network (facilitated through the connection of the UE 502 with the Wi-Fi AP/AC 504).

As illustrated, the additional PDN connection establishment procedure is provided through use of an ANQP query 522, which may include APN, attachment type, PCO, and like values. This results in conducting the GTP/PMIP tunneling procedure 524 (e.g., using select of the procedures illustrated in FIG. 4) among the Wi-Fi AP/AC 504 and components of the 3GPP EPC (such as the PDN-GW 506, a PDN-GW 2 508, a vPCRF 510, an AAA Proxy 512, an hPCRF 514, or an HSS/AAA 516).

An ANQP response 526, which may include an IP address and other information for connection of the UE, such as a mobile station (MS) 502, is communicated from the Wi-Fi AP/AC 504 to the MS 502. Accordingly, upon successful establishment of the GTP/PMIP Tunneling Procedure 524, a new GTP/PMIP tunnel 530 will exist in addition to the Existing GTP/PMIP Tunnel 520.

Figure 6:
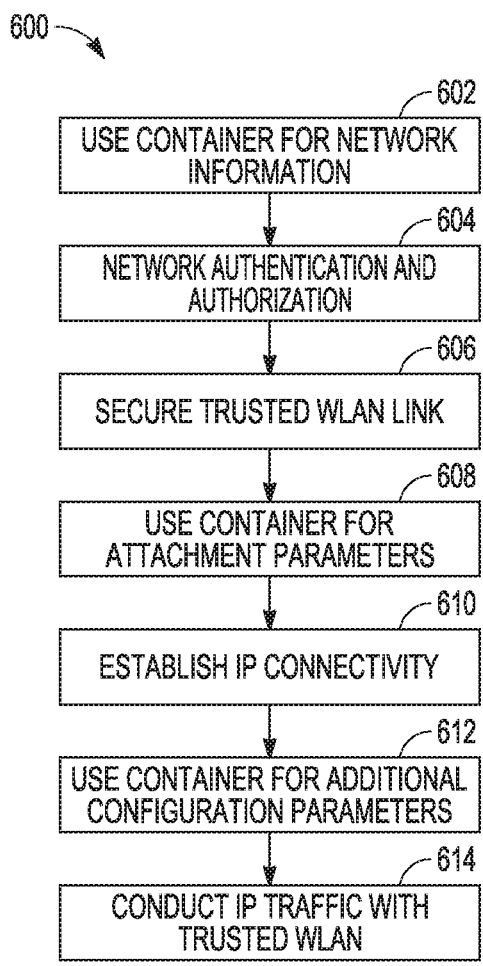
FIG. 6 illustrates a flowchart of an example method for establishing a connection between a 3GPP EPC and a UE via a trusted WLAN in connection with some examples.

FIG. 6 illustrates a flowchart of an example method 600 for establishing a trusted connection between a 3GPP EPC and an UE connected to a WLAN in connection with some example embodiments. Although the operations of method 600 are depicted in sequence, it will be understood that this sequence is provided for illustration of one example method, and variations to the sequence may occur. This may include additional, fewer, or substituted operations, or a different order than depicted. For example, based on the network configuration, certain configuration parameters may not need to be exchanged; and likewise alternate operations may be used to facilitate authentication or attachment of the WLAN or devices connected through the WLAN.

As illustrated, one or more containers may be used for exchanging network information (operation 602) in ANQP communications between the UE and the WLAN. The communications may include an ANQP element providing a container with a PLMN listing (for example, as illustrated in FIGS. 3C and 3D), or an ANQP element providing a Trusted WLAN Container (for example, as illustrated in FIG. 3B) including network connectivity information such as connection parameters.

Based on the information exchanged with the one or more containers, various network authentication and authorization operations may be performed among the UE, WLAN, and 3GPP EPC (operation 604). This may be followed by operations to secure the trusted WLAN link (operation 606), for example, by performing an IEEE standard 802.11i-2004 (WPA2) 4-Way handshake for a Wi-Fi connection and deriving session keys to secure the Wi-Fi connection.

One or more ANQP elements providing a container may be used to exchange network attachment parameters (operation 608). Operations may be conducted between the WLAN and the 3GPP EPC to establish IP connectivity for the UE (operation 610), for example through use of a DHCP request and response for a dynamic IP address.

Additionally, one or more ANQP elements providing a container may be used to exchange additional configuration parameters as necessary for establishing UE and trusted network communications (operation 612). Upon successful security and IP connectivity establishment among the UE, the now-trusted WLAN, and the 3GPP EPC, IP traffic is communicated using the connections (operation 614).

Although several of the described example embodiments were included with reference to the use of 3GPP standard wireless network implementations, it will be understood that the present techniques may be implemented in connection with a variety of other wireless wide area network standards, such as WiMAX, CDMA2000, EV-DO, and other 2G, 3G, 4G, and 5G-standard WWAN protocols and devices. Likewise, although several of the described example embodiments were included with reference to the use of Wi-Fi and WLAN communication standards from the IEEE 802.11 standards family, the present techniques may be implemented in connection with a variety of other wireless local area network standards and protocols. Therefore, the terms "WWAN," "WLAN," and "wireless network" as used herein are not necessarily intended to be limiting to the use of any particular network protocol, but may also include a variety of wireless protocols and devices communicating via such wireless protocols.

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
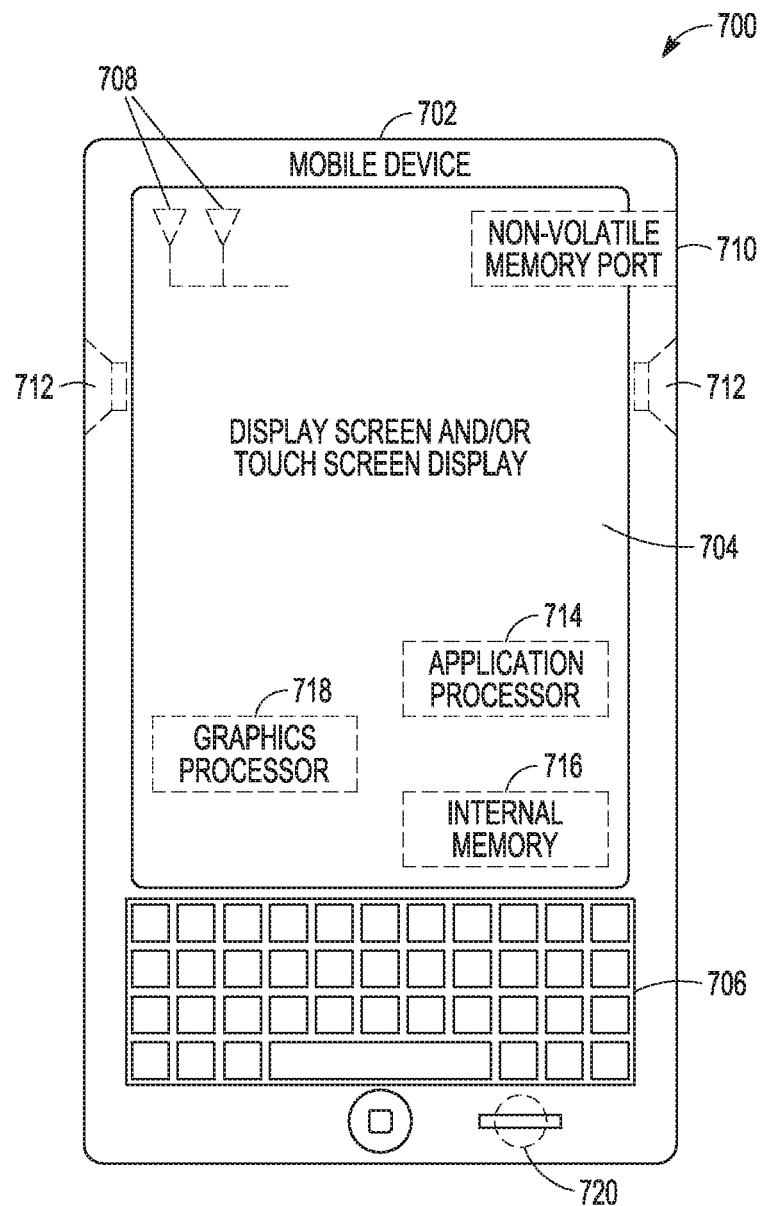
FIG. 7 illustrates an example mobile device that may be used in connection with the configurations and techniques described herein.

FIG. 7 provides an example illustration of a mobile device 700, such as a user equipment (UE), a mobile station (MS), a mobile wireless device, a mobile communication device, a tablet, a handset, or other type of mobile wireless device. The mobile device may include one or more antennas 708 configured to communicate with a base station (BS), an evolved Node B (eNB), other type of wireless wide area network (WWAN) access point, or other network equipment (NE). The mobile device may be configured to communicate using at least one wireless communication standard including 3GPP LTE, WiMAX, High Speed Packet Access (HSPA), Bluetooth, and Wi-Fi. The mobile device 700 may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Figure 8:
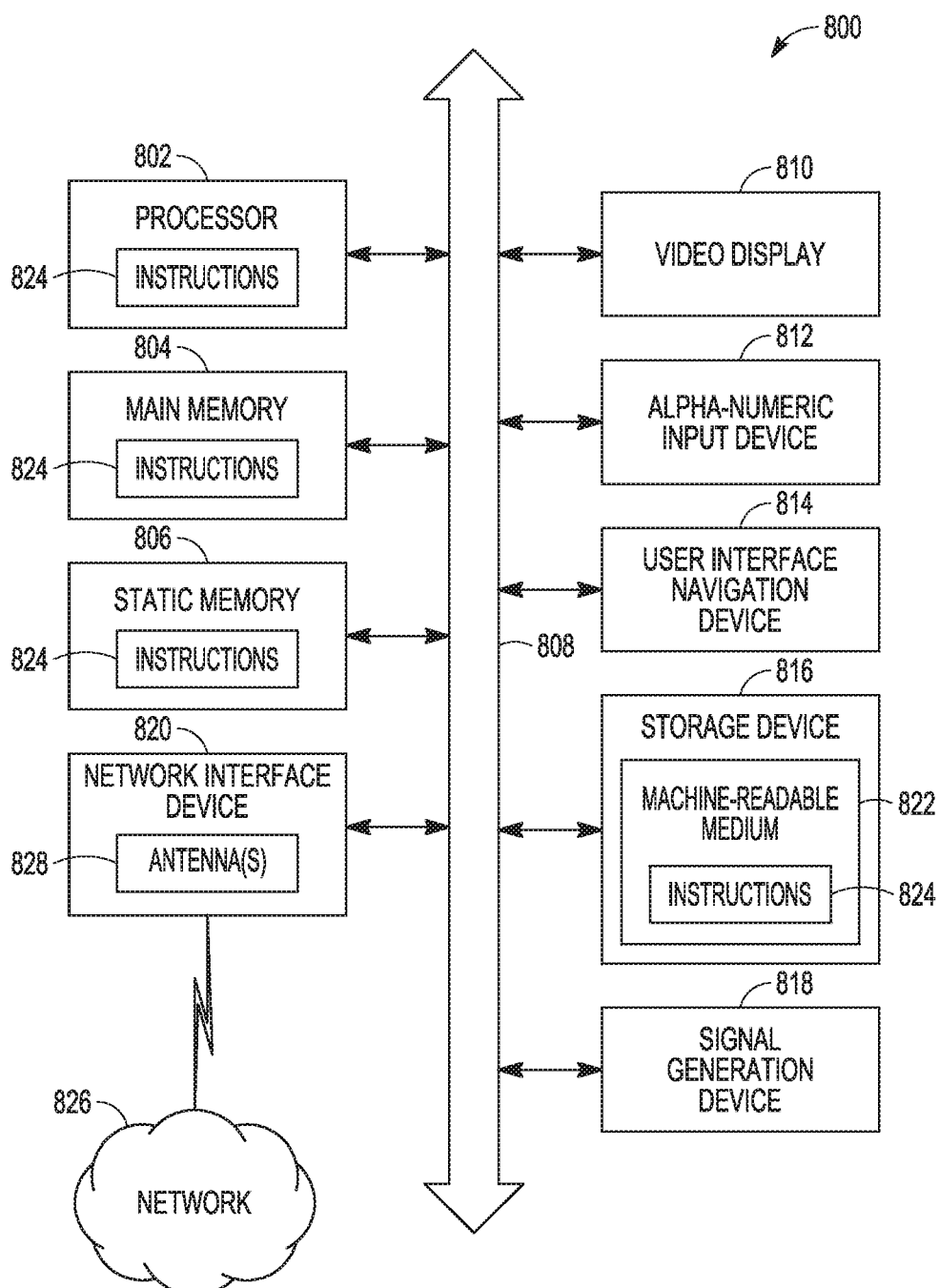
FIG. 8 illustrates an example computer system that may be used as a computing platform for the computing devices described herein.

FIG. 8 is a block diagram illustrating an example computer system machine upon which any one or more of the methodologies herein discussed may be run. Computer system 800 may be embodied as a computing device, the mobile device 700, mobile and non-mobile user equipment, WLAN equipment and devices, 3GPP network devices or equipment, or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), and a network interface device 820 (which may include or operably communicate with one or more antennas 828, transceivers, or other wireless communications hardware), and one or more sensors (not shown), such as a global positioning system (GPS) sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800. The main memory 804, static memory 806, and the processor 802 also constitute machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a wireless local area network configuration and a wireless wide area network configuration, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom VLSI circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes user equipment (UE) (for example, one or more systems, apparatuses, devices, or other configurations) configured to establish a connection with an Enhanced Packet Core (EPC) through a trusted attachment with a wireless local area network (WLAN), the UE comprising processing circuitry arranged to: obtain, from the WLAN, a list of supported public land mobile networks (PLMNs); conduct a security exchange with the WLAN; receive authentication information from results of the security exchange; establish, using one or more containers provided in Access Network Query Protocol (ANQP) communications, attachment parameters to the WLAN for an EPC of one of the PLMNs; receive, using one or more containers provided in ANQP communications, configuration parameters from the WLAN; and implement the configuration parameters and conduct communications with the WLAN based on the configuration parameters.

In Example 2, the subject matter of Example 1 may optionally include the UE communicating with the WLAN according to a standard from the IEEE 802.11 standards family, wherein the EPC is provided by a Wireless Wide Area Network (WWAN) operating according to a Long Term Evolution (LTE) or Long Term Evolution-Advanced (LTE-A) standard.

In Example 3, the subject matter of one or any combination of Examples 1-2 may optionally include operations to obtain, from the WLAN, a list of supported PLMNs that include: transmitting an ANQP query including a 3GPP Network Information Element, wherein the 3GPP Network Information Element included in the ANQP query provides a request for PLMNs supported by the WLAN; and receiving, from the WLAN, an ANQP response including a 3GPP Network Information Element, wherein the 3GPP Network Information Element included in the ANQP response provides a list of PLMNs supported by the WLAN.

In Example 4, the subject matter of one or any combination of Examples 1-3 may optionally include operations to establish attachment parameters to the WLAN for one of the PLMNs by: transmitting an ANQP query including a trusted WLAN container, wherein the trusted WLAN container included in the ANQP query provides network connectivity information to establish a trusted connection between the UE and the EPC via the WLAN; and receiving, from the WLAN, an ANQP response including a trusted WLAN container, wherein the trusted WLAN container included in the ANQP response provides configuration parameters to the UE for the trusted connection.

In Example 5, the subject matter of one or any combination of Examples 1-4 may optionally include processing circuitry arranged to: transmit a DHCP request to the WLAN; and receive, in a DHCP response message from the WLAN, the IP address allocated by a Packet Data Network Gateway (PDN-GW) of the EPC.

In Example 6, the subject matter of one or any combination of Examples 1-5 may optionally include the UE being a mobile computing device selected from the group consisting of a smartphone, a personal digital assistant (PDA), a notebook computer, a netbook computer, and a tablet.

In Example 7, the subject matter of one or any combination of Examples 1-6 may optionally include network equipment (for example, one or more systems, apparatuses, devices, or other configurations) configured to provide a wireless local area network (WLAN), the network equipment comprising processing circuitry arranged to establish the WLAN as a trusted access network for facilitating communications between a user equipment (UE) and an Evolved Packet Core (EPC), by: using one or more communications to exchange network information with the UE during connection establishment, the network information including connection parameters to enable the UE to connect to the EPC through the WLAN; authenticating the UE with the EPC; establishing IP connectivity with the UE from the EPC; and transmitting communications between the UE and the EPC using the established IP connectivity.

In Example 8, the subject matter of Example 7 may optionally include processing circuitry being provided by either or both of an access controller or one or more access points, wherein the network equipment provides the WLAN according to a standard from the IEEE 802.11 standards family, and wherein the EPC is provided by a Wireless Wide Area Network (WWAN) operating according to a Long Term Evolution (LTE) or Long Term Evolution-Advanced (LTE-A) standard.

In Example 9, the subject matter of one or any combination of Examples 7-8 may optionally include the network information exchanged with the UE during connection establishment being exchanged in one or more Dynamic Host Configuration Protocol (DHCP) communications or one or more Extensible Authentication Protocol (EAP) communications.

In Example 10, the subject matter of one or any combination of Examples 7-9 may optionally include the network information exchanged with the UE being provided by one or more containers in Access Network Query Protocol (ANQP) communications, wherein at least one of the one or more containers in the ANQP communications is provided according to a standard from the IEEE 802.11 standards family.

In Example 11, the subject matter of one or any combination of Examples 7-10 may optionally include using the one or more containers in the ANQP communications to exchange network information with the UE by: receiving, from the UE, an ANQP query including a 3GPP Network Information Element, wherein the 3GPP Network Information Element included in the ANQP query provides a request for Public Land Mobile Networks (PLMNs) supported by the WLAN; and responding, to the UE, with an ANQP response including a 3GPP Network Information Element, wherein the 3GPP Network Information Element included in the ANQP response provides a list of PLMNs supported by the WLAN.

In Example 12, the subject matter of one or any combination of Examples 7-11 may optionally include using the one or more containers in the ANQP communications to exchange network information with the UE by: receiving, from the UE, an ANQP query including a trusted WLAN container, wherein the trusted WLAN container included in the ANQP query provides network connectivity information to establish a trusted connection between the UE and the EPC via the WLAN; and responding, to the UE, with an ANQP response including a trusted WLAN container, wherein the trusted WLAN container included in the ANQP response provides configuration parameters to the UE for the trusted connection.

In Example 13, the subject matter of one or any combination of Examples 7-12 may optionally include authenticating the UE with the EPC by: transmitting an authentication request to an authentication, authorization, and accounting (AAA) server of the EPC; receiving, from the AAA server, an Extensible Authentication Protocol (EAP) status message; and providing an indication to the UE with results of the authentication request based on the EAP status message.

In Example 14, the subject matter of one or any combination of Examples 7-13 may optionally include the processing circuitry further configured to secure the connection between the UE and the WLAN using a security procedure defined by one or more standards from the IEEE 802.11 standards family.

In Example 15, the subject matter of one or any combination of Examples 7-14 may optionally include establishing IP connectivity with the UE from the EPC by: receiving a DHCP request from the UE; transmitting an IP request to a Packet Data Network Gateway (PDN-GW) of the EPC; receiving a IP response from the PDN-GW including an IP address allocated by the PDN-GW; and transmitting, to the UE in a DHCP response message, the IP address allocated by the PDN-GW.

In Example 16, the subject matter of one or any combination of Examples 7-15 may optionally include authenticating the UE with the EPC by transmitting an authentication request message including an UE Network Access identifier, a Visited Public Land Mobile Network identifier, a WLAN access identity, an UE Media Access Control (MAC) address, and an indication whether the WLAN supports access to the EPC; wherein the connection parameters provide attachment parameters to the WLAN including the preferred Access Point Name, Packet Data Network Type, and Attach Type.

Example 17 may include, or may optionally be combined with the subject matter of one or any combination of Examples 1-16 to include a method (e.g., a process, technique, or procedural implementation) performed in a system, apparatus, device, network, or other setting, for establishing a trusted connection between a user equipment (UE) and an Evolved Packet Core (EPC), comprising: exchanging EPC network information with a UE in one or more Access Network Query Protocol (ANQP) communications, the ANQP communications provided according to a standard from the IEEE 802.11 standards family; authenticating the UE with the EPC; establishing IP connectivity with the UE from the EPC; and relaying communications between the UE and the EPC via a tunnel with the EPC.

In Example 18, the subject matter of Example 17 may optionally include the method being performed in a wireless local area network (WLAN) by either or both of an access controller or one or more access points of the WLAN, wherein the WLAN operates according to a standard from the IEEE 802.11 standards family, and wherein the EPC is provided by a network operating according to a Long Term Evolution (LTE) or Long Term Evolution-Advanced (LTE-A) standard.

In Example 19, the subject matter of one or any combination of Examples 17-18 may optionally receiving, from the UE, an ANQP query including a 3GPP Network Information Element, wherein the 3GPP Network Information Element included in the ANQP query provides a request for PLMNs supported by the WLAN; and responding, to the UE, with an ANQP response including a 3GPP Network Information Element, wherein the 3GPP Network Information Element included in the ANQP response provides a list of PLMNs supported by the WLAN.

In Example 20, the subject matter of one or any combination of Examples 17-19 may optionally include receiving, from the UE, an ANQP query including a trusted WLAN container, wherein the trusted WLAN container included in the ANQP query provides network connectivity information to establish a trusted connection between the UE and the EPC via the WLAN; and responding, to the UE, with an ANQP response including a trusted WLAN container, wherein the trusted WLAN container included in the ANQP response provides configuration parameters for the UE.

In Example 21, the subject matter of one or any combination of Examples 17-19 may optionally include transmitting an authentication request to an authentication, authorization, and accounting (AAA) server of the EPC; receiving, from the AAA server, an Extensible Authentication Protocol (EAP) status message; and providing an indication to the UE with the results of the authentication request based on the EAP status message.

In Example 22, the subject matter of one or any combination of Examples 17-21 may optionally include securing the connection with the UE using a security procedure defined by one or more standards from the IEEE 802.11 standards family.

In Example 23, the subject matter of one or any combination of Examples 17-22 may optionally include establishing IP connectivity with the UE from the EPC includes: receiving a DHCP request from the UE; sending an IP request to a Packet Data Network Gateway (PDN-GW) of the EPC; receiving a IP response from the PDN-GW including an IP address allocated by the PDN-GW; and sending, to the UE in a DHCP response message, the IP address allocated by the PDN-GW.

In Example 24, the subject matter of one or any combination of Examples 17-23 may optionally include establishing a trusted connection between a second UE and the EPC, by: receiving an ANQP query from the second UE including additional connection parameters; performing a tunneling procedure to establish a second tunnel with the EPC, the tunneling procedure using the additional connection parameters received from the second UE and connection parameters from the EPC network information exchanged with the UE; transmitting an ANQP response to the second UE including an IP address for the second UE; and relaying communications between the second UE and the EPC via the second tunnel with the EPC.

The Abstract of the Disclosure is intended to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
a processor configured to cause a user equipment (UE) to:
  discover a trusted wireless local area network (WLAN) access network (TWAN), wherein discovery of the TWAN is determined from 3rd Generation Partnership Project (3GPP) Cellular Network Information retrieved in an Access Network Query Protocol (ANQP) response to transmission by the UE of an ANQP query, wherein the ANQP response comprises a list of Public Land Mobile Networks (PLMNs) supported by the TWAN;
  encode Authentication, Authorization, and Accounting (AAA) information of the UE for transmission to the TWAN to relay to an AAA server over an STa interface, wherein a response from the AAA server indicates whether access to an Evolved Packet Core (EPC) is allowed for the UE on the TWAN; and
  conduct communications via an S2a interface with the EPC through the TWAN and packet data network gateway (PDN-GW) of the EPC after authentication by the AAA server.

2. The apparatus of claim 1, wherein the processor is further configured to cause the UE to:
discover the TWAN from among a plurality of TWANs dependent on Access Network Discovery Selection Function (ANDSF) information related to WLAN access.

3. The apparatus of claim 1, wherein the processor is further configured to cause the UE to:
discover the TWAN from among a plurality of TWANs that support S2a connectivity to a Home Public Land Mobile Network (HPLMN).

4. The apparatus of claim 1, wherein the processor is further configured to cause the UE to:
encode a Dynamic Host Configuration Protocol (DHCP) request for transmission to the WLAN after selection of the TWAN; and
decode, in a DHCP response message from the TWAN, an IP address allocated by a Packet Data Network Gateway (PDN-GW) of the EPC.

5. The apparatus of claim 1, wherein:
the 3GPP Cellular Network Information includes parameters to enable the TWAN to attach to the EPC and a list of information elements supported by ANQP.

6. The apparatus of claim 1, wherein:
the ANQP query comprises a first ANQP 3GPP Cellular Network Information Element (IE), wherein the first 3GPP Network IE provides a request for PLMNs supported by the TWAN; and
wherein the processor is further configured to cause the UE to decode, from the TWAN, an ANQP response that comprises a second 3GPP Network IE, wherein the second 3GPP Network Information Element provides a list of Public Land Mobile Networks (PLMNs) supported by the TWAN.

7. The apparatus of claim 1, wherein:
the ANQP query comprises a first TWAN container, wherein the first TWAN container provides network connectivity information to establish a trusted connection between the UE and the EPC via the TWAN; and
the processor is further configured to cause the UE to decode, from the TWAN, an ANQP response that comprises a second TWAN container, wherein the second TW AN container provides configuration parameters to the UE for the trusted connection.

8. The apparatus of claim 1, wherein the processor is further configured to cause the UE to:
decode the response from the AAA server based on an Extensible Authentication Protocol (EAP) status message.

9. The apparatus of claim 1, wherein:
the processor comprises a baseband processor configured to encode transmissions to, and decode transmissions from, the TWAN.

10. An apparatus, comprising:
a processor configured to cause a user equipment (UE) to:
  select a trusted wireless local area network (WLAN) access network (TWAN);
  encode Authentication, Authorization, and Accounting (AAA) information of the UE for transmission to the TWAN to relay to an AAA server over an STa interface, a response from the AAA server indicating whether access to a 3rd Generation Partnership Project (3GPP) Evolved Packet Core (EPC) is allowed for the UE on the TWAN; and
  conduct communications via an S2a interface with the EPC through the TWAN and packet data network gateway (PDN-GW) of the EPC after authentication by the AAA server.

11. The apparatus of claim 10, wherein the processor is further configured to cause the UE to:
select the TWAN from among a plurality of TWANs dependent on Access Network Discovery Selection Function (ANDSF) information related to WLAN access.

12. The apparatus of claim 10, wherein the processor is further configured to cause the UE to:
select the TWAN from among a plurality of TWANs that support S2a connectivity to a Home Public Land Mobile Network (HPLMN).

13. The apparatus of claim 10, wherein the processor is further configured to cause the UE to:
encode a Dynamic Host Configuration Protocol (DHCP) request for transmission to the WLAN after selection of the TWAN; and
decode, in a DHCP response message from the TWAN, an IP address allocated by a Packet Data Network Gateway (PDN-GW) of the EPC.

14. An apparatus, comprising:
a processor configured to cause a trusted wireless local area network (WLAN) access network (TWAN) to:
  connect to a user equipment (UE) via a SWw interface;
  send Authentication, Authorization, and Accounting (AAA) information of the UE received for transmission via an STa interface to an AAA server of an Evolved Packet Core (EPC);

receive a response from the AAA server indicating whether access to the EPC is allowed for the UE on the TWAN; and relay communications between the EPC and the UE through a packet data network gateway (PDN-GW) of the EPC after authentication by the AAA server, wherein the communications between the TWAN and the EPC are provided via an S2a interface.

15. The apparatus of claim 14, wherein:

ANQP procedures are performed between the UE and the TWAN, wherein the ANQP procedures comprise reception of an ANQP query and transmission of an ANQP response, and the ANQP response comprises a list of Public Land Mobile Networks (PLMNs) supported by the TWAN.

16. The apparatus of claim 14, wherein:

the TWAN supports S2a connectivity to a Home Public Land Mobile Network (HPLMN).

17. The apparatus of claim 14, wherein the processor is further configured to cause the TWAN to:

decode a Dynamic Host Configuration Protocol (DHCP) request from the UE; and encode, in a DHCP response message from the WLAN, an IP address allocated by the PDN-GW of the EPC.

18. The apparatus of claim 17, wherein:

3GPP Cellular Network Information includes parameters to enable the TWAN to attach to the EPC and a list of information elements supported by the ANQP procedures.

19. The apparatus of claim 17, wherein the processor is further configured to cause the TWAN to:

decode an ANQP query from the UE that comprises a first ANQP 3GPP Cellular Network Information Element (IE); and encode, for transmission to the UE, an ANQP response that comprises a second 3GPP Network IE, wherein the second 3GPP Network Information Element provides a list of Public Land Mobile Networks (PLMNs) supported by the TWAN.

20. The apparatus of claim 14, wherein the processor is further configured to cause the TWAN to:

encode Access Network Query Protocol (ANQP) 3rd Generation Partnership Project (3GPP) Cellular Network Information for WLAN broadcast by a WLAN access point (AP) in the TWAN, wherein the ANQP 3GPP Cellular Network Information comprises a public land mobile network (PLMN) supported by S2a connectivity of the WLAN AP to the PLMN.

* * * * *